United States Patent
Kuwahara et al.

(10) Patent No.: US 6,399,158 B1
(45) Date of Patent: Jun. 4, 2002

(54) METHOD AND APPARATUS FOR CURING ULTRAVIOLET-CURING RESIN

(75) Inventors: Kazuya Kuwahara; Katsuya Nagayama; Ichiro Tsuchiya, all of Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/485,883

(22) PCT Filed: Jun. 10, 1999

(86) PCT No.: PCT/JP99/03128

§ 371 (c)(1),
(2), (4) Date: Feb. 18, 2000

(87) PCT Pub. No.: WO99/65611

PCT Pub. Date: Dec. 23, 1999

(30) Foreign Application Priority Data

Jun. 19, 1998 (JP) .............................. 10-172496
Aug. 28, 1998 (JP) .............................. 10-242649

(51) Int. Cl.⁷ .............................. C08F 2/48; G02B 6/16; B05C 9/12; B05D 3/06
(52) U.S. Cl. ...................... 427/513; 427/487; 427/508; 427/553; 427/558; 427/163.2; 118/622; 118/642; 250/492.1
(58) Field of Search .............................. 427/163.2, 331, 427/372.2, 487, 508, 513, 517, 532, 542, 553, 558; 118/66, 67, 68, 622, 642; 250/492.1, 503.1, 504 R (56) References Cited

U.S. PATENT DOCUMENTS 5,766,784 A * 6/1998 Baskaran et al. ............ 428/702
6,123,927 A * 9/2000 Ogawa et al. ................ 424/59

FOREIGN PATENT DOCUMENTS

| JP | 63233807 A | * | 9/1988 |
| JP | 63-233807 | | 9/1988 |
| JP | 63277539 A | * | 11/1988 |
| JP | 63-277539 | | 12/1988 |
| JP | 4-342445 A | * | 11/1992 |
| JP | 10-59479 | | 3/1998 |
| JP | 10059749 A | * | 3/1998 |

* cited by examiner

Primary Examiner—Shrive P. Beck
Assistant Examiner—Wesley Markham
(74) Attorney, Agent, or Firm—McDermott, Will & Emery (57) ABSTRACT

The amount of dimming components originating in an ultraviolet-curing resin and adhering to a quartz tube is reduced, and a decline in the ultraviolet transmittance is prevented, during ultraviolet-curing of a resin coated on a liner body through an ultraviolet-transmitting tubular member placed inside a curing apparatus and of curing ultraviolet-curing resin by irradiating ultraviolet rays from outside the ultraviolet-transmitting tubular member. Embodiments include coating the inner surface of the ultraviolet-transmitting tubular member with titanium and employing an atmosphere of lover 0.1% oxygen.

6 Claims, 9 Drawing Sheets

METHOD AND APPARATUS FOR CURING ULTRAVIOLET-CURING RESIN

This application is a 371 of PCT/JP99/03128, filed on Jun. 10, 1999.

TECHNICAL FIELD

The present invention relates to a method for curing ultraviolet-curing resin coated on a streaked substance and an ultraviolet curing apparatus used in the method.

BACKGROUND ART

Methods in which an ultraviolet-curing resin is coated on a linear body such as an optical fiber, a copper wire, a fiber thread, or on a linear body in which a plurality of linear bodies are bundled together or arranged parallel to each other, and is then cured by irradiation of ultraviolet rays, are widely used as methods for coating linear body.

Figure 9:
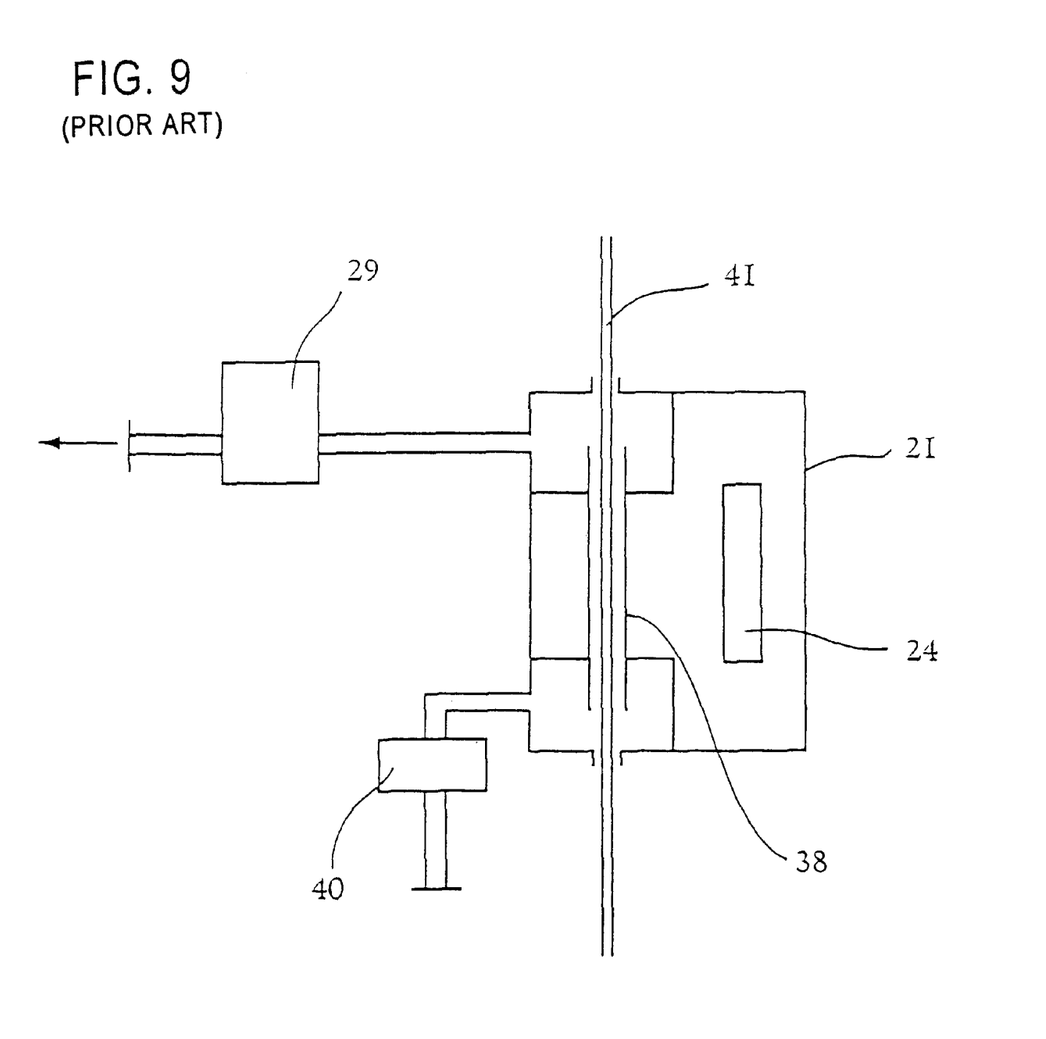
FIG. 9 is a drawing showing a structure of a conventional curing apparatus.

The method disclosed in Japanese Patent Publication No. 6-84015 can be given as an example. To explain this method with reference to FIG. 9, a quartz tube 38 is placed inside a curing apparatus 21 as a tubular member for transmitting ultraviolet rays (hereinafter called "ultraviolet-transmitting tubular member"), and a linear body 41 coated with ultraviolet-curing resin is passed through the quartz tube 38, and the ultraviolet-curing resin coated on the linear body is cured by irradiation of ultraviolet rays from an ultraviolet lamp 24 outside the quartz tube. At that time, the gas inside the quartz tube 38 is purged by the flow of inert gas the flow rate of which is controlled by a flow-rate-regulating valve 40 and which is simultaneously exhausted therefrom with a suction pump 29. Despite this, some of the ultraviolet-curing resin vaporizes and adheres to the inner surface of the quartz tube. Therefore, dimming of the quartz tube 38 increases as the operation proceeds and the ultraviolet transmittance of the quartz tube declines. As a result, the curing degree of the ultraviolet-curing resin declines because the ultraviolet rays reaching the linear body decreases until eventually quality problems arise.

In order to avoid this problem, the ultraviolet dosage transmitted through the quartz tube is measured and the quartz tube is exchanged for a quartz tube with no dimming when the ultraviolet dosage decreases to the lower limit at which the ultraviolet-curing resin can be sufficiently cured. Actually, the quartz tube is exchanged at the point when curing of the ultraviolet-curing resin of a linear body is completed, if it is foreseeable, by measuring the ultraviolet rays transmitted through the wall of the quartz tube, that the transmission of ultraviolet rays through the wall of the quartz tube will become insufficient for the curing operation of the ultraviolet-curing resin of the next linear body.

Further, in Japanese Patent Application Laid-Open No. 10-59749 a method is disclosed in which the inside surface of a quartz tube is coated with titanium dioxide such that it is difficult for the ultraviolet-curing resin to adhere to the quartz tube.

The disclosure of the published specification, which uses the terms slightly different from those used in the present application, is explained in the terms used herein.

Figure 8:
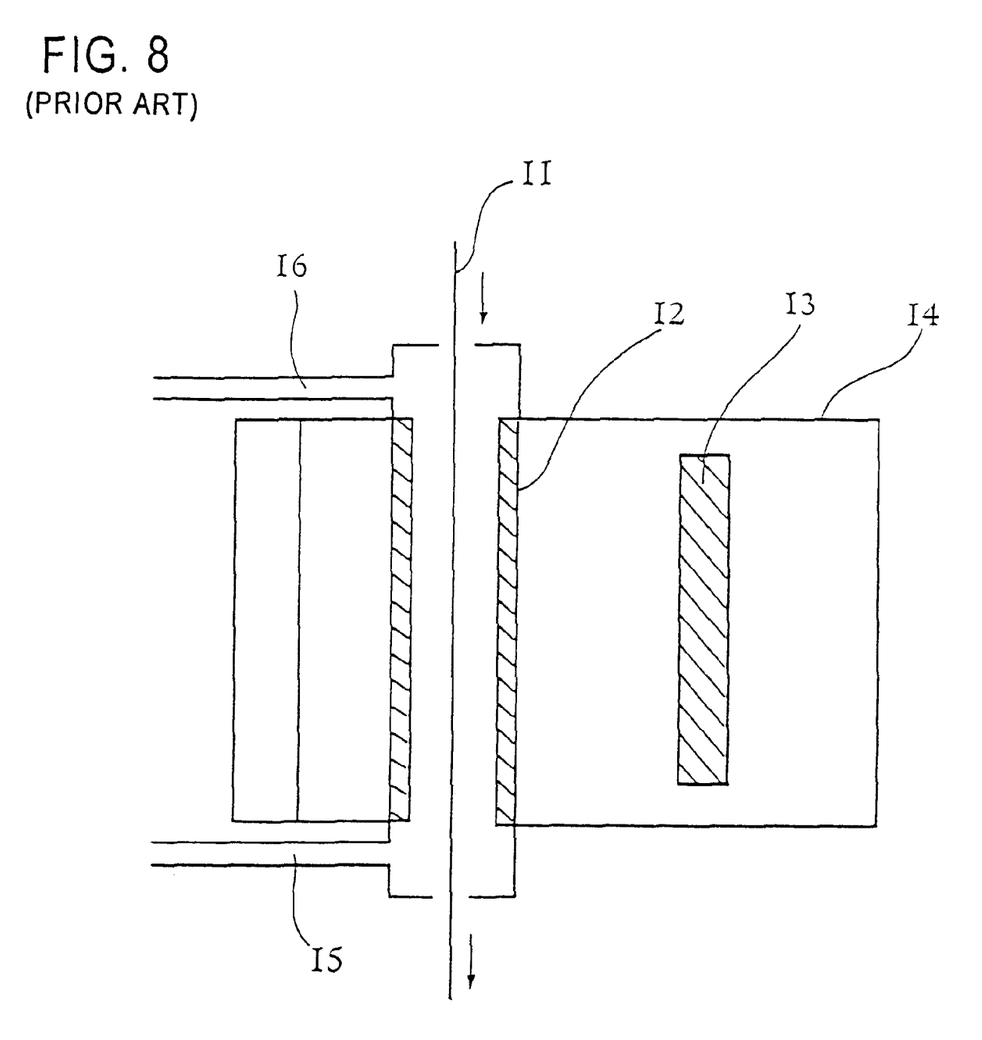
FIG. 8 is a vertical cross-section of a conventional ultraviolet irradiating apparatus.

FIG. 8 shows a vertical cross-section of the apparatus disclosed in Japanese Patent Application Laid-Open No. 10-59749. Numeral 11 indicates a coated linear body comprising an optical fiber coated with ultraviolet-curing resin, 12 a quartz tubular member allowing the transmission of ultraviolet rays, 13 an ultraviolet lamp, 14 an apparatus containing box, 15 a gas supply tube, and 16 a gas exhaust tube, respectively.

In this ultraviolet irradiating apparatus, the ultraviolet rays are irradiated to the coated linear body via the tubular member 12 from the ultraviolet lamp 13 placed on the outer side of the tubular member 12 while the coated linear body 11 is passed through the tubular member 12 and the ultraviolet-curing resin coated on the linear body is cured. During that time, nitrogen gas is supplied from the gas supply tube 15 into the tubular member 12 and exhausted therefrom through the gas exhaust tube 16.

The tubular member 12 disclosed in Japanese Patent Application Laid-Open No. 10-59749 is that one having a titanium dioxide layer of 0.5–100 $\mu$m of thickness on the inner surface of a quartz tube. This titanium dioxide layer promotes the decomposition of tarry organic substances generated during the curing reaction and is intended to reduce the decline in ultraviolet transmission due to the adherence of tarry organic substances.

DISCLOSURE OF INVENTION

However, the inventors of the present invention found that despite coating the inner surface of the quartz tube with titanium dioxide as disclosed in Japanese Patent Application No. 10-59749, dimming components originating in the ultraviolet-curing resin adhere to the quartz tube and the frequency of exchanging the quartz tubes is not decreased.

Further, it also became clear that although dimming components did not adhere quite so much, a sufficient irradiation dosage could not be obtained from an ultraviolet irradiating lamp of normal usage and occasionally the ultraviolet-curing resin was undercured.

It was found that, when a quartz tube having the inner surface coated with titanium dioxide was used as disclosed in Japanese Patent Application Laid-Open No. 10-59749, the transmission coefficient of the ultraviolet rays in a wavelength region of 360 nm or shorter, which is necessary for curing a resin, fell to less than 0.5, which is comparatively less than in the case of a quartz tube without a titanium dioxide layer.

In order to obtain an ultraviolet rays dose sufficient to perform curing of the ultraviolet-curing resin, there is also a method using a high-output ultraviolet irradiating lamp, but it is not economical.

In other words, the present invention provides an ultraviolet irradiation method and an ultraviolet irradiating apparatus that solves the aforementioned problems of the prior art.

The present invention is characterized in that, in a method for applying a ultraviolet-curing resin on a linear body and curing it by irradiating ultraviolet rays from outside the ultraviolet-transmitting tubular member while passing it through an ultraviolet-transmitting tubular member placed inside a curing apparatus, the inner surface of the ultraviolet-transmitting tubular member is coated with titanium dioxide and the oxygen concentration is controlled to 0.1% or more in an atmosphere inside the ultraviolet-transmitting tubular member.

In the above method, the oxygen concentration inside the ultraviolet-transmitting tubular member can be raised to 0.1% or more by purging with a mixture of an inert gas and air or oxygen inside the ultraviolet-transmitting tubular member.

It is even better if the oxygen concentration inside the ultraviolet-transmitting tubular member is 0.5% or more.

In the above method it is even better if the thickness of coating layer including titanium dioxide is 0.03 μm or more but less than 0.5 μm.

The frequency of need to exchange ultraviolet-transmitting tubular members of the curing apparatus can be decreased because dimming of the ultraviolet-transmitting tubular member can be prevented by the above-described methods of the present invention, that is, by coating the inner surface of the ultraviolet-transmitting tubular member with titanium dioxide and controlling the inner atmosphere of the ultraviolet-transmitting tubular member to a designed oxygen concentration. Further, because a single operation of coating an ultraviolet-curing resin can be continued for a longer period of time, a longer linear body can be obtained, which could not have been obtained conventionally.

BRIEF DESCRIPTION OF DRAWINGS

FIG. 1 is a drawing showing an embodiment of the ultraviolet irradiating apparatus of the present invention: (A) is a vertical cross-section and (B) is a horizontal cross-section along the X-axis.

BEST MODE FOR CARRYING OUT THE INVENTION

One important element of the present invention is coating titanium dioxide on the inner surface of the ultraviolet-transmitting tubular member.

As the methods for coating with titanium dioxide, there are the following methods: coating with titanium dioxide mixed with an organic solvent and then sintering it, thermal spraying of titanium dioxide, a flame sedimentary method of titanium halide, and hydrolysis sedimentary sintering of an organic titanium compound. These methods all can be applied in the present invention.

However, titanium dioxide absorbs near- ultraviolet light. To be exact, it absorbs ultraviolet rays having a wavelength shorter than 400 nm. Thus, if the ultraviolet-transmitting tubular member is coated with titanium dioxide, the ultraviolet radiation transmitted through the tubular member for curing the ultraviolet-curing resin will be considerably reduced depending on the thickness of the titanium dioxide coating because it is comprised of near ultraviolet rays, and consequently the curing of the ultraviolet-curing resin will be insufficient. Therefore, to avoid insufficient curing, it is best to coat the tubular member as thinly as possible with titanium dioxide.

Figure 2:
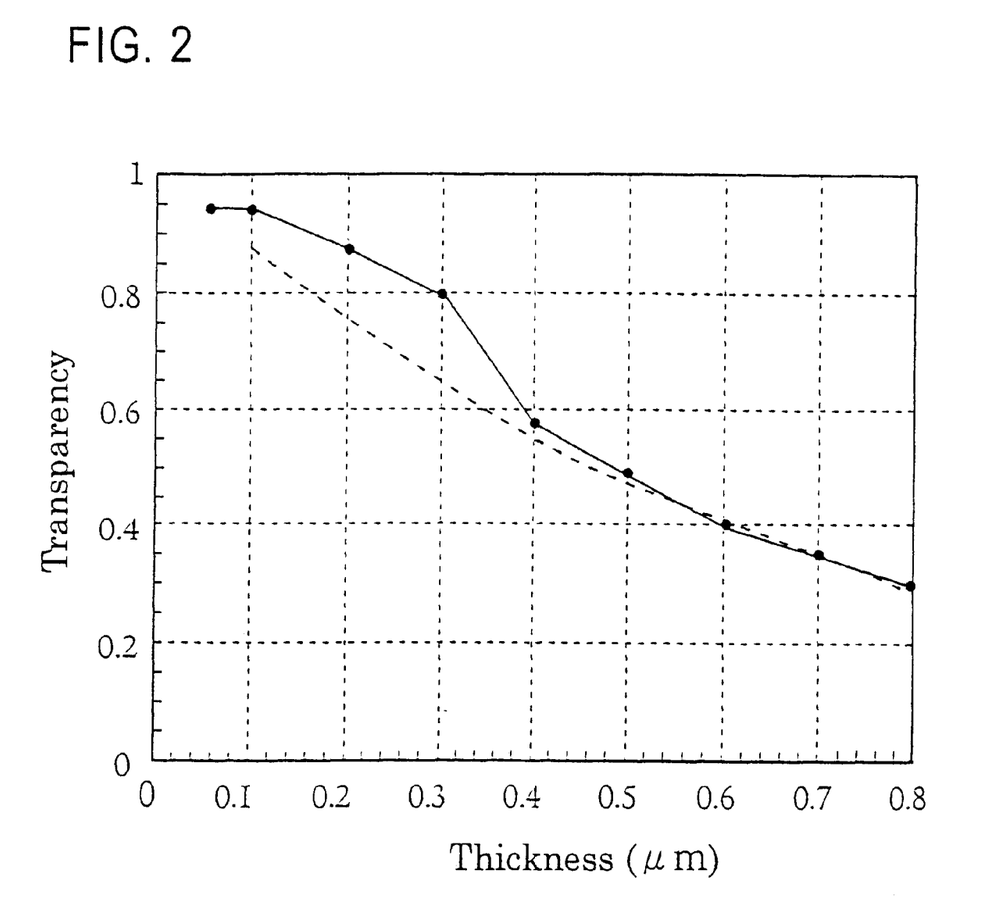
FIG. 2 is a graph showing the relationship between coating layer thickness and the transmission coefficient of ultraviolet rays at a wavelength of 360 nm.

According to Lambert-Beer's Law, a theoretical relationship between the thickness of the coating layer and the transmission coefficient is as shown by the dotted line in FIG. 2. However, the results of measuring the transmission coefficients after coating with various thickness of layers using titanium dioxide having particles of 30 nm or less in less in diameter are as shown by the solid line. According to these results, when the thickness of the layer is below 0.5 μm, not only can a transmission coefficient of 0.5 or greater be achieved, but also the transmission coefficient higher than the theoretical curve can be obtained and unpredicated greater efficiency can be obtained.

Titanium dioxide coating is now explained in further detail.

Figure 1A:
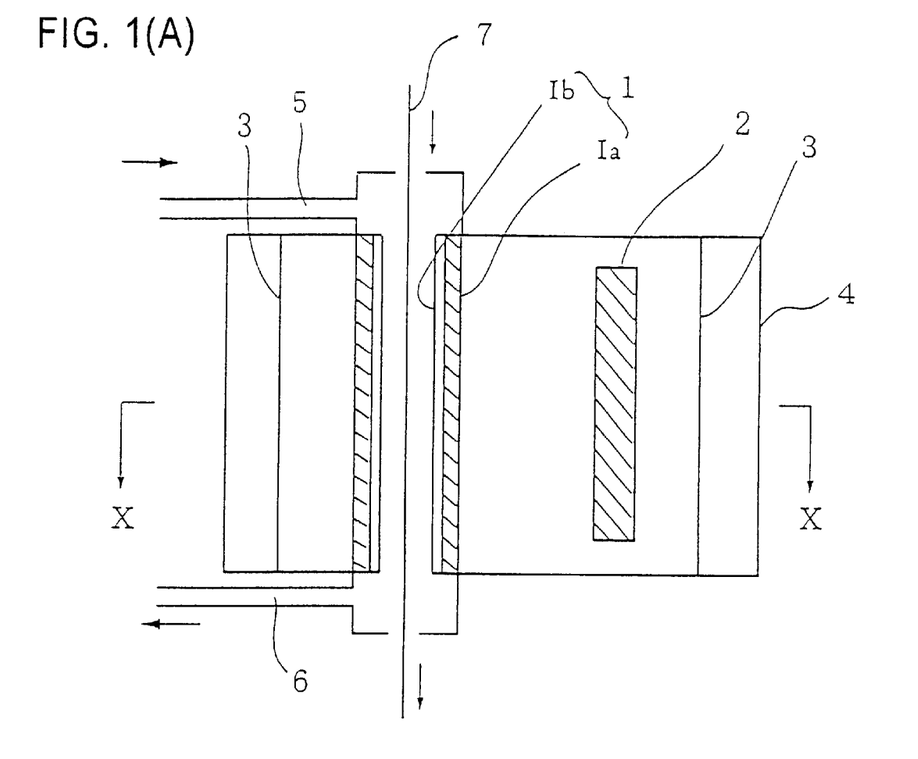
Figure 1B:
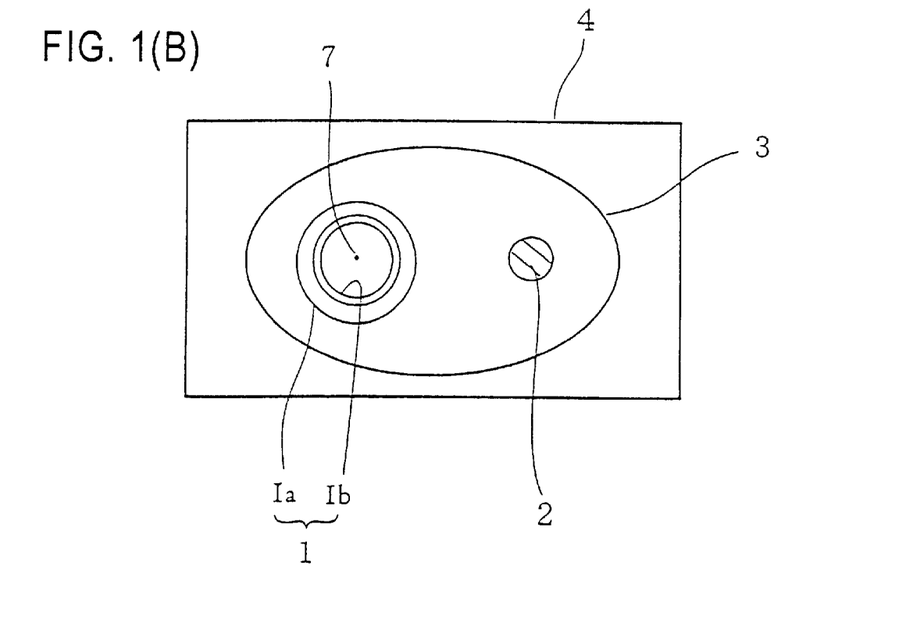

FIG. 1 is drawings showing a preferred embodiment of the ultraviolet irradiating apparatus of the present invention: FIG. 1(A) is a vertical cross-section and FIG. 1(B) is a horizontal cross-section in the direction shown by the X. In FIG. 1, 1 is a tubular member, 1a is a quartz tube, 1b is a coating layer, 2 is an ultraviolet lamp, 3 is a mirror, 4 is an apparatus containing box, 5 is a gas supply tube, 6 is a gas exhaust tube, and 7 is a coated linear body.

The coated linear body 7 is formed by coating a linear body, such as an optical fiber, a copper wire, a fiber thread, or a ribbon, or a linear body comprising a set of linear bodies bound together or arranged parallel to each other, with an ultraviolet-curing resin, using a resin-applying apparatus which is not shown in the drawing but is located immediately upstream of the ultraviolet irradiating apparatus of the present invention. Further, the coating of the linear body 7 is completed when the ultraviolet-curing resin is cured by receiving the ultraviolet rays irradiated from the ultraviolet lamp 2 through the wall of the tubular member 1 in the ultraviolet irradiating apparatus of the present invention. The mirror 3 is used for reflecting the ultraviolet rays and for irradiating ultraviolet rays efficiently around the periphery of the coated linear body 7.

The tubular member 1 is the quartz tube 1a on inner surface of which a coating layer 1b including titanium dioxide is formed and allows transmission of the ultraviolet rays. For the preparation of the tubular member 1, the coating layer 1b is formed by flow-coating the inside surface of the quartz tube 1a with a xylene liquid in which powdered titanium dioxide and polysilazane are dispersed at a weight ratio of 1:1 and by sintering the coating at approximately 450° C. As a result, the polysilazane changes to silicon dioxide chemically and acts as a binder.

In order to form the coating layer between 0.03 and 0.5 μm of thickness, the degree of dilution with the xylene is adjusted in the above dispersion liquid. Concerning the mixture proportions of titanium dioxide and polysilazane, any ratio by weight between 1:0.25–1:2 can be used in the same way.

When the coating layer is formed, because the polysilazane chemically changes to silicon dioxide and fulfills the role of a binder, even if the coating layer is thin, it adheres securely to the inner surface of the quartz tube and has a high adhering strength. Moreover, the binder made of silicon dioxide does not interfere the transmission of ultraviolet rays through the wall of the tubular member because it does not absorb ultraviolet rays.

Figure 3:
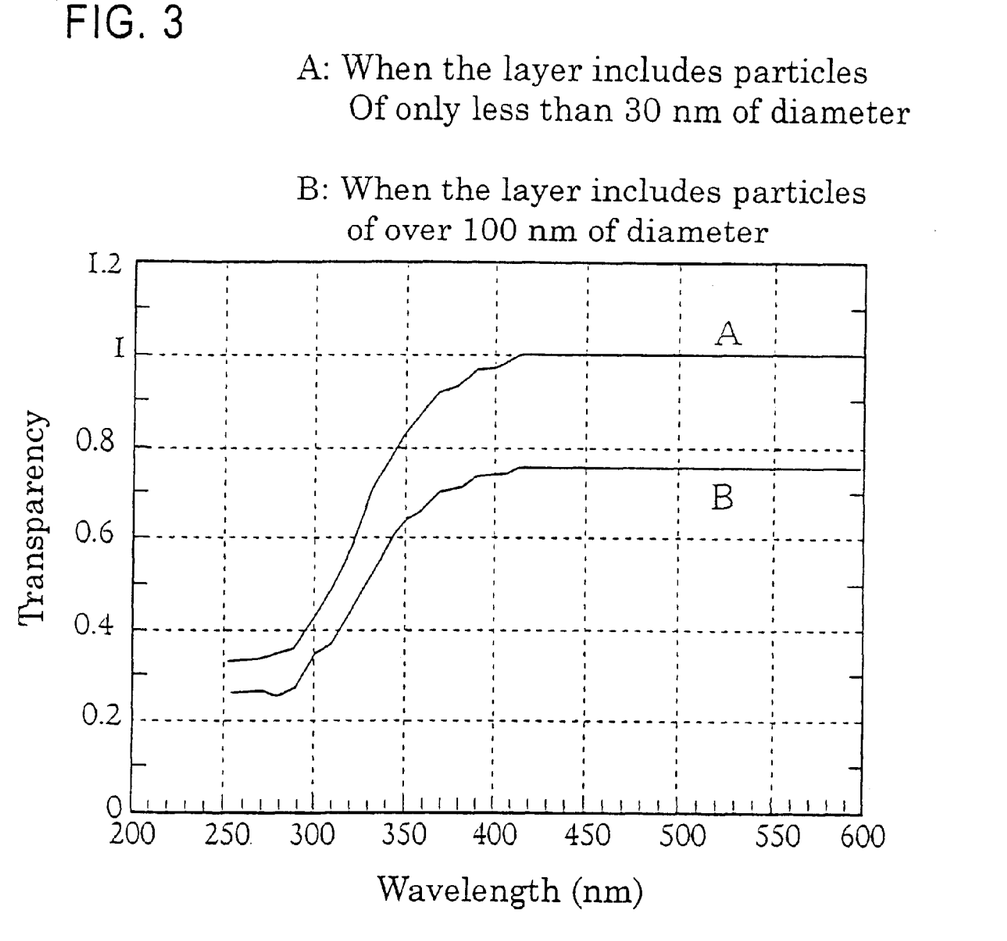
FIG. 3 is a graph showing the change in the transmission coefficient of the coating layer for the range of 250 to 600 nm of the wavelength of the ultraviolet rays for the cases where the titanium dioxide particles of different diameter are used.

Next, when the diameters of the particles of the titanium dioxide used in the coating layer were changed, with the thickness of the layer at a fixed value of 0.2 μm, it was found that the transmission coefficient changes depending on the diameter of the particles of the titanium dioxide as shown in FIG. 3. FIG. 3 is a graph showing the relationship between the transmission coefficient of the coating layer and the wavelength of the ultraviolet rays in a case where the titanium dioxide particles in the layer substantially include those of 100 nm or greater in diameter and a case where the titanium dioxide particles in the layer include only those of 30 nm or smaller in diameter, respectively.

Considering the wavelength of the ultraviolet rays for curing the ultraviolet-curing resin is usually in the range of 350 to 400 nm in the ultraviolet irradiating apparatus, the inventors investigated the transmission coefficients over the range of those wavelengths. As a result, it was found that the transmission coefficient is approximately 0.7 when the titanium dioxide particles of 100 nm or greater in diameter are substantially included in the layer, whereas the transmission coefficient is approximately 0.9 when only the titanium dioxide particles of 30 nm or smaller in diameter are included in the layer. Thus, it is clear that by choosing a preferable diameter of the particles of the titanium dioxide the transmission coefficient can be greatly improved.

Concerning the crystal structure of the titanium dioxide, there are anatase type and rutile type. The particles of anatase type are comparatively small and are not larger than about 50 nm in diameter, while the particles of rutile type are comparatively large, and are between 200–300 nm of diameter. Also, because the anatase type have higher photoconductivity, it is preferable to use anatase type as the coating material on the inner surface of the tubular member.

The inventors discovered that the coating itself of the ultraviolet-transmitting tubular member with titanium dioxide does not prevent adherence of the ultraviolet-curing resin, and rather, the adherence of organic substances is prevented through the decomposition of vaporized matter of the ultraviolet-curing resin by the photocatalytic function of the coating layer including titanium dioxide and it is necessary to keep the oxygen concentration inside the ultraviolet-transmitting tubular member at 0.1% or more in addition to coating the inner surface of the ultraviolet-transmitting tubular member with titanium dioxide.

In other words, it is necessary to make inside of the tubular memer to an atmosphere including oxygen in order that the coating layer 1b including titanium dioxide shown in FIG. 1 exhibits the effects for decomposing organic substances through a photocatalytic function. Thus, if inside of the tubular member 1 is made to an atmosphere containing oxygen by flowing a mixture gas of, for example, inert gases including 0.1% or more oxygen from the gas supply tube 5 and by exhausting the mixture gas through the gas exhaust tube, the coating layer will exhibit a photocatalytic function and decompose the organic substances vaporized during curing of the ultraviolet-curing resin.

The promotion of the decomposition of organic substances with titanium dioxide is due to a photo-catalytic effect. As the decomposition reaction occurs on the surface of the coating layer containing titanium dioxide, it is not necessary to make a thick coating layer containing titanium dioxide as described in Japanese Patent Application Laid-Open 10-59749. A thickness of less than 0.5 μm is sufficient for the coating layer. Of course, as mentioned above, the thinnest possible layer is preferable because it is easier for ultraviolet rays to pass through. However, if the thickness of the coating layer containing titanium dioxide is thinner than the particle diameter of the titanium dioxide, the adhesion of the titanium dioxide particles to the inner surface of the quartz tube becomes unstable and the durability of the coating layer decreases. Thus, if using titanium dioxide including particles of 30 nm diameter, the thickness of the coating layer should be 0.03 μm or more.

If prepared in this way, even if the ultraviolet irradiating apparatus is operated over a long period of time organic substances will not adhere to the inner wall of the tubular member 1 shown in FIG. 1, and a decline of the ultraviolet ray transmission coefficient of the tubular member 1 can be prevented. Thus, the task of cleaning the inner surface of the tubular member 1 is reduced and the operation ratio of the ultraviolet irradiating apparatus can be improved. The fact that even if the thickness of the coating layer is at the lower limit of the present invention of 0.03 μm, the same effect as when the layer is of a thickness of 0.5 μm can be obtained concerning the decomposition of organic substances due to the photocatalytic function of the coating layer, is confirmed by the fact that even if the ultraviolet irradiating apparatus is operated over a long period of time there is no need for the elimination and cleaning of organic substances.

In the present invention, if the oxygen concentration inside the ultraviolet-transmitting tubular member is over 0.1%, the adherence of dimming components to the ultraviolet-transmitting tubular member can be reduced. If it is over 0.5%, the adherence of dimming components to the ultraviolet-transmitting member can be strikingly reduced. Further, if the oxygen concentration inside the ultraviolet-transmitting tubular member is set at 2% or more, the adherence of dimming components to the ultraviolet-transmitting tubular member can be almost completely prevented.

It is preferable to choose an oxygen concentration suitable for the type and composition of the ultraviolet-curing resin because the speed of adhesion of dimming components to the ultraviolet-transmitting tubular member differs depending on the type and composition of the ultraviolet-curing resin.

As the oxygen concentration inside the ultraviolet-transmitting tubular member affects the degree of curing of the ultraviolet-curing resin, it is preferable to select the oxygen concentration suitable for fulfilling the required degree of curing, depending on the use of the linear body.

During coating an optical fiber with ultraviolet-curing resin, if the oxygen concentration is 5% or less, there will be no quality problems with the curing degree of the surface of the ultraviolet-curing resin.

In the case of curing an ultraviolet-curing resin used for coloring an optical fiber that is coated with an ultraviolet-curing resin, if the oxygen concentration inside the ultraviolet-transmitting tubular member is over 1%, the surface of the ultraviolet-curing resin for coloration will be undercured, and consequently its adherence to an ultraviolet-curing resin, which is used for coating optical fibers so as to make an optical fiber ribbon in a later process, will become too strong. As a result, when the optical fiber ribbon is separated into single fibers, not only the ultraviolet-curing resin used in the optical fiber ribbon but also the ultraviolet-curing resin layer used for coloration is peeled off and the fibers cannot be distinguished by color. Thus, when an optical fiber is coated with ultraviolet-curing resin for coloration, the oxygen concentration should be 1% or less.

A linear body comprising a colored optical fiber is called a coated optical fiber. Several coated optical fibers aligned and coated together are called an optical fiber ribbon.

If the oxygen concentration exceeds 5% at the time of curing ultraviolet-curing resin used for making an optical fiber ribbon, the surface of the ultraviolet-curing resin will be undercured, and consequently layers of the optical fiber ribbon will stick to each other when it is wound around a bobbin. Thus, when the optical fiber ribbons are unwound from the bobbin the adhered parts are pulled and the ultraviolet-curing resin for the ribbon and the ultraviolet-curing resin for coloration are peeled off. Thus, when several coated optical fibers are coated together with the ultraviolet-curing resin to make an optical fiber ribbon, the oxygen concentration should not exceed 5%.

Figure 4A:
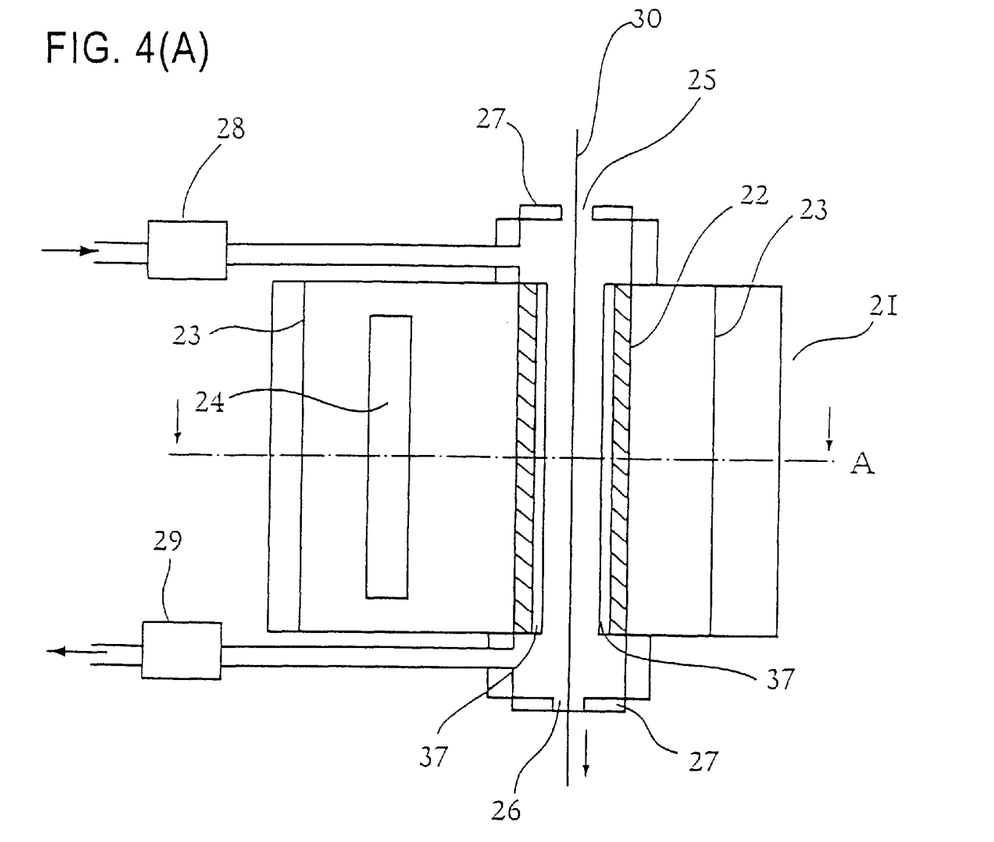
FIG. 4 is a drawing showing a structure of the curing apparatus of the present invention.
Figure 4B:
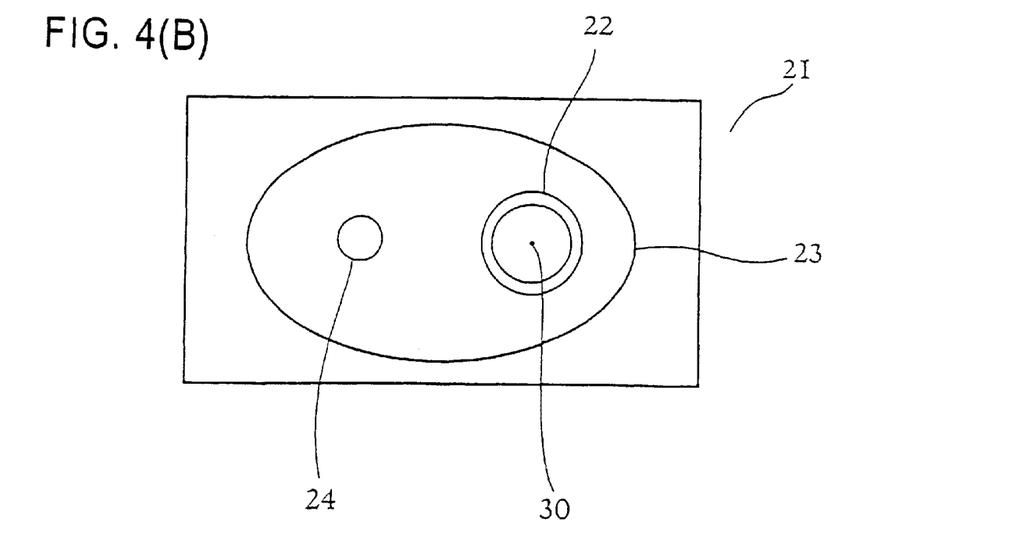

The control of the oxygen concentration within the ultraviolet-transmitting tubular member is explained with reference to FIG. 4, using an example in which ultraviolet-curing resin coating on an optical glass fiber is cured.

An ultraviolet-transmitting tubular member 22 coated on its inner surface with a $TiO_2$ layer 37 and an ultraviolet lamp 24 are placed inside a curing apparatus 21. The ultraviolet-transmitting tubular member 22 is placed such that an optical fiber 30 passes through the central axis of the ultraviolet-transmitting tubular member 22. A mirror 23 is placed in the vicinity of the ultraviolet-transmitting tubular member 22 and the ultraviolet lamp 24 such that it surrounds both. Because the ultraviolet-transmitting tubular member 22 and the ultraviolet lamp 24 are placed at the focal points of the mirror 23, the ultraviolet rays irradiated from the ultraviolet lamp are reflected by the mirror 23 and efficiently irradiated on the ultra-violet-transmitting tubular member.

The ultraviolet-transmitting tubular member 22 is purged with inert gas at a flow rate adjusted with a flow rate adjuster 28. Because air can pass through the inside of the ultraviolet-transmitting tubular member through an entrance 25 and an exit 26, flowing of the inert gas makes the inside atmosphere of the ultraviolet-transmitting tubular member 22 a mixed gas of the air and the inert gas. When the flow rate of the inert gas increases the concentration of inert gas inside the ultraviolet-transmitting tubular member 22 increases and the oxygen concentration decreases. In terms of cost, it is preferable to use nitrogen gas as the inert gas.

By calculating the relationship between the flow rate of the inert gas and the oxygen concentration in advance, the inert gas should be flowed such that a designed oxygen concentration is achieved. Alternatively, a designed oxygen concentration in the ultraviolet-transmitting tubular member can be achieved by placing an oxygen concentration sensor inside the ultraviolet-transmitting tubular member, sending a signal from this sensor to a feedback control apparatus, and adjusting the flow rate of the inert gas through this feedback control apparatus.

The oxygen concentration inside the ultraviolet-transmitting tubular member 22 can also be controlled by installing a shutter 27 at the exit 26 or the entrance 25 of the curing apparatus 21 and adjusting its degree of opening. When the degree of opening in the shutter 27 is small the oxygen concentration inside the ultraviolet-transmitting tubular member will decrease.

By calculating the relationship between the degree of opening in the shutter and the oxygen concentration in advance, the degree of opening of the shutter should be adjusted such that the desired oxygen concentration is achieved. Alternatively, the desired oxygen concentration inside the ultraviolet-transmitting tubular member can be achieved by placing an oxygen concentration sensor inside the ultraviolet-transmitting tubular member, sending a signal from this sensor to a feedback control apparatus, and adjusting the degree of opening of the shutter by this feedback control apparatus.

The oxygen concentration inside the ultraviolet-transmitting tubular member can also be adjusted by installing a suction pump 29 in the exhaust system and actively exhausting gas inside the ultraviolet-transmitting tubular member.

The concentration of oxygen inside the ultraviolet-transmitting tubular member may depend on the line speed of the optical fiber. For example, if the flow rate of inert gas inside the ultraviolet-transmitting tubular member is kept constant at a low flow rate such as 20 slm, the oxygen concentration inside the ultraviolet-transmitting tubular member will be higher, as the faster becomes the line speed. If the flow rate of the inert gas is set at about 40 slm, within the range of normal line speed, the oxygen concentration inside the ultraviolet-transmitting tubular member does not depend on the line speed so much.

Therefore, when the flow rate of inert gas is comparatively low, the oxygen concentration within the ultraviolet-transmitting tubular member under regular conditions after the line speed is raised to a normal manufacturing speed should be a value within the above range.

By adjusting each of the above elements, it is possible to control the oxygen concentration inside the ultraviolet-transmitting tubular member to a desired value.

A mixed gas adjusted to the desired oxygen concentration may also be flowed inside the ultraviolet-transmitting tubular member by mixing air and inert gas beforehand. However, in this case it must be cared that there may be the influence of the line speed, and the value of the oxygen concentration inside the ultraviolet-transmitting tubular member may differ from the oxygen concentration of the mixed gas.

EXAMPLE

The example is described in further detail in the following. The present invention is not limited to this example.

1. Titanium dioxide coating

Powdered titanium dioxide ($TiO_2$) having particle diameters of 30 nm or smaller was mixed with polysilazane (—($SiH_2NH$—) at a ratio by weight of 1:1 and diluted with xylene. This liquid mixture was poured into a quartz tube to coat the inner surface thereof.

The quartz tube was then calcinated at 450±50° C. to form a coating layer on the inner surface of the quartz tube. The thickness of the coating titanium dioxide layer was adjusted with the degree of dilution with xylene.

2. Optical fiber coating

Figure 5:
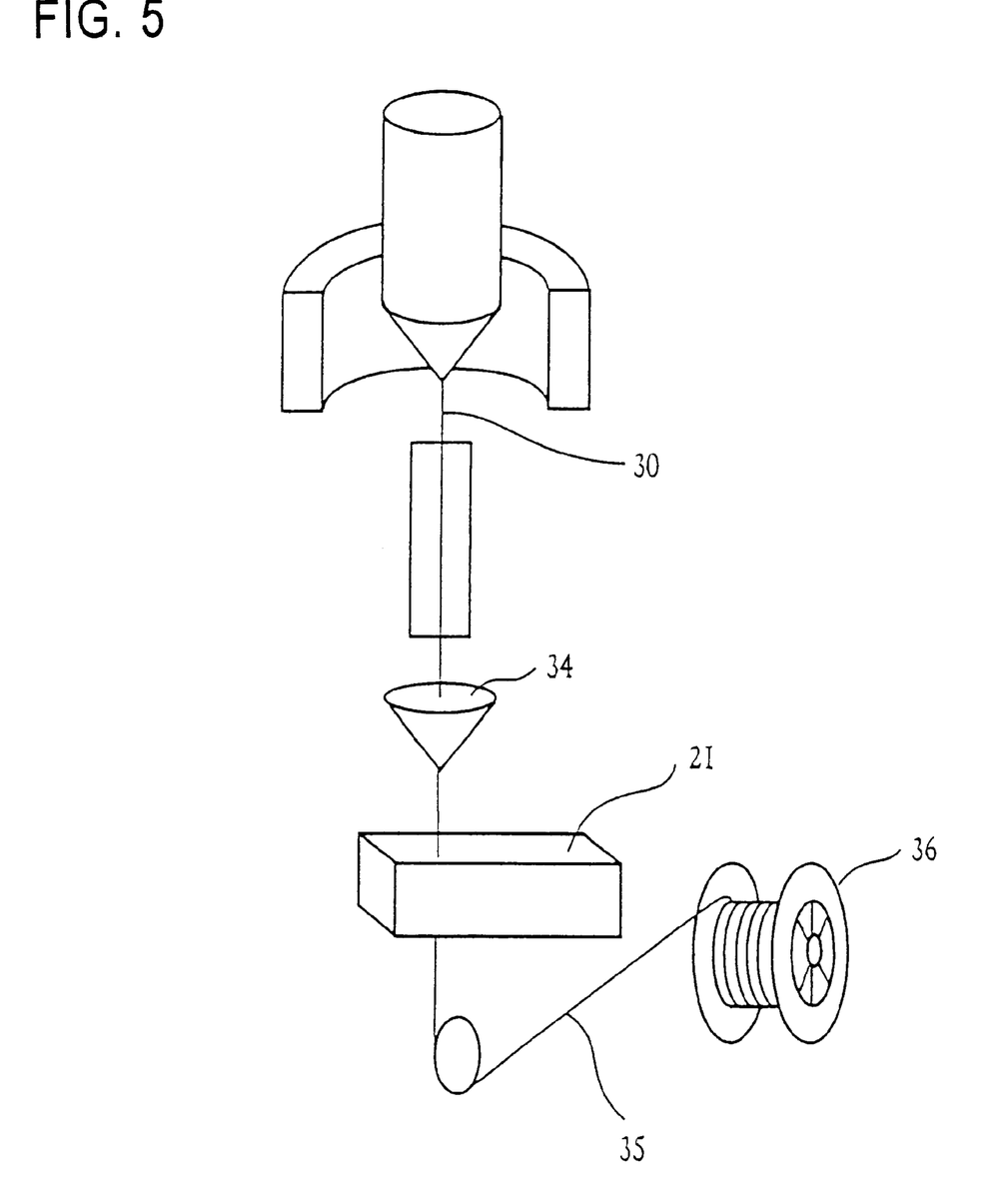
FIG. 5 is a drawing showing a structure of an optical fiber manufacturing apparatus.

Using the optical fiber manufacturing apparatus shown in FIG. 5, and optical fiber 30 was coated with ultraviolet-curing resin (a urethane acrylate resin) with a coating device 34, and the ultraviolet-curing resin was cured with a curing device 21. The degree of viscosity of the ultraviolet-curing resin was 1000–2000 cp at 40° C. (temperature at coating). In this way, an optical fiber coated in ultraviolet-curing resin, in other words, the coated optical fiber 35 was manufactured, and was wound on a spool 36. The winding rate (line speed) at this time was 800 m/minute.

Figure 6:
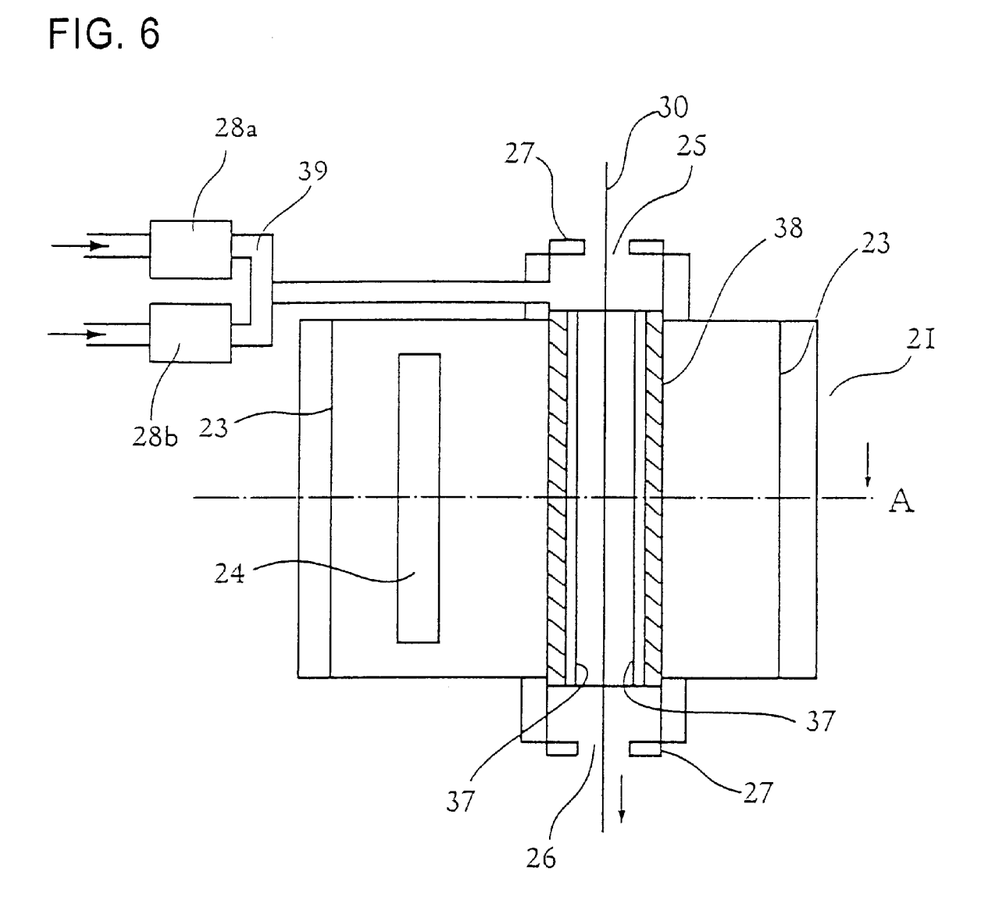
FIG. 6 is a drawing showing a structure of the curing apparatus of the present invention.

The structure of the curing apparatus at this time is shown in FIG. 6. A quartz tube 38 coated on its inner surface with a $TiO_2$ layer 37 by the above mentioned coating method was set as the ultraviolet-transmitting tubular member inside a curing apparatus 21. Parts in FIG. 6 in common with FIG. 4 are referred to with the same references, and explanations therefore will be omitted.

Nitrogen gas was used as an inert gas. The inert gas and air were both flowed, with their flow rates adjusted by flow rate adjusters 28a and 28b, respectively, to be mixed in a mixing chamber 39 and via a flow path flowed into the quartz tube 38 in the ultraviolet curing apparatus 21.

The oxygen concentration inside the quartz tube 38 was adjusted to 0.01% (100 ppm), 0.10%, or 1.00% by adjusting the flow rate of the nitrogen gas and the flow rate of the air as shown in Table 1. In each case, shutters 27 were installed in the entrance 25 and the exit 26 of the curing apparatus 21 with diameters of 6 mm. Then 40 slm of the mixed gas was exhausted with a suction pump 29.

TABLE 1

|  | Example 1 | Example 2 | Example 3 |
| --- | --- | --- | --- |
| Oxygen concentration (%) | 0.01 | 0.10 | 1.00 |
| Nitrogen flow rate (slm) | 40 | 40 | 38 |
| air flow rate (slm) | 0.02 | 0.20 | 2.00 |

For comparison, a quartz tube not coated with $TiO_2$ was used as the ultraviolet-transmitting tubular member and ultraviolet-curing resin on an optical fiber was cured in the same way as described above.

Figure 7:
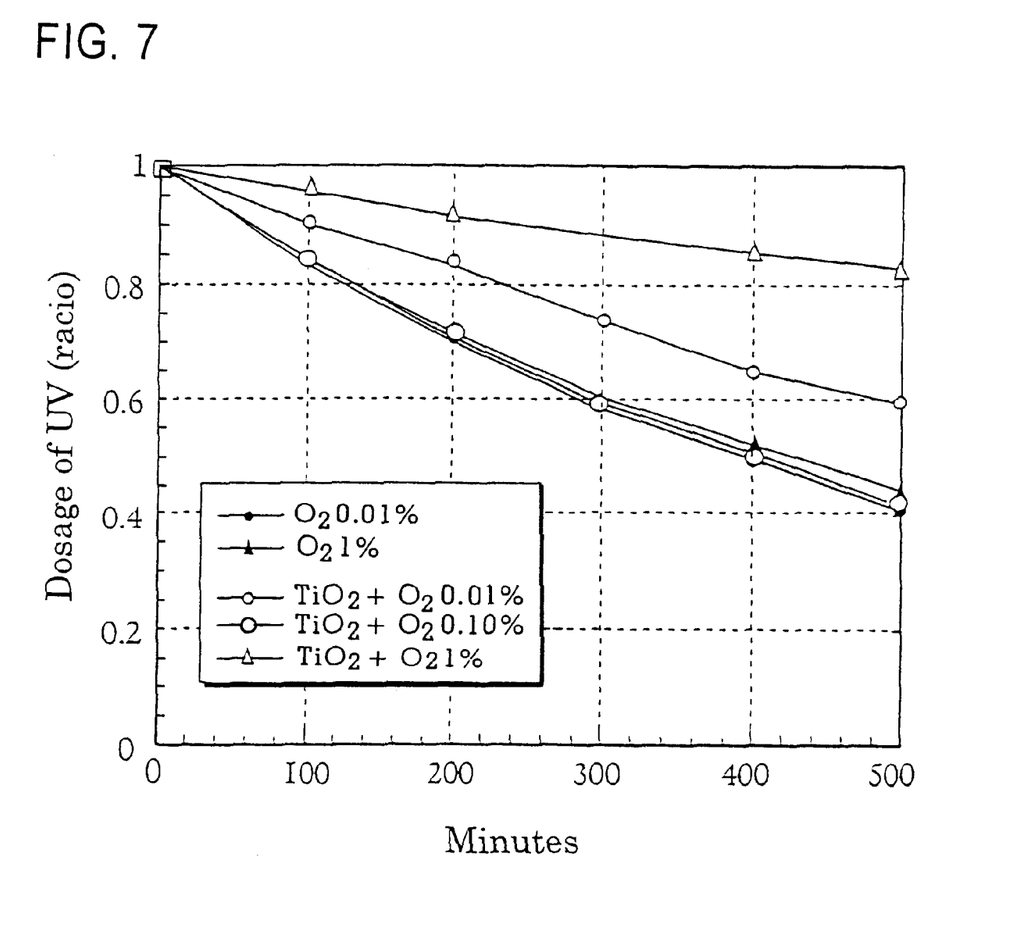
FIG. 7 is a drawing showing the change in the ultraviolet transmittance over a lapse of time

In each of the above cases, the flux density of ultraviolet light transmitted through the wall of ultraviolet-transmitting tubular member was measured with a radiometer. The change over elapsed time in the amount of ultraviolet rays transmitted through the ultraviolet-transmitting tubular member is shown in FIG. 7. The values along the vertical axis in FIG. 7 are relative values expressing the amount of ultraviolet rays transmitted through the quartz tube after 100 km optical fiber was coated, where the amount of ultraviolet rays passing through the quartz tube when there is no dimming in the quartz tube before starting of coating is determined as 1.

Further, the amount of ultraviolet rays transmitted through the quartz tube coated with $TiO_2$ and the quartz tube uncoated with $TiO_2$ after operating for 500 minutes is shown in Table 2.

TABLE 2

|  | Example 1 | Example 2 | Example 3 |
| --- | --- | --- | --- |
| Oxygen Concentration (%) | 0.01 | 0.10 | 1.00 |
| Coated | 0.42 | 0.60 | 0.85 |
| Uncoated | 0.41 | 0.42 | 0.45 |

As can be seen in example 1 of Table 2, the decline in transmittance of ultraviolet rays at an oxygen concentration of 0.01% inside the quartz tube was remarkable and the effect of $TiO_2$ was almost undetectable. On the other hand, as can be seen from examples 2 and 3 of Table 2 and FIG. 7, if the atmosphere has 0.1% or more oxygen concentration, a decline in transmittance of ultraviolet rays can be substantially prevented, and then it is understood that adherence of dimming components originating in the ultraviolet-curing resin to the inner surface of the quartz tube can be remarkably reduced through the use of a quartz tube coated with $TiO_2$.

In other words, if the oxygen concentration is over 0.1%, dimming components originating in the ultraviolet-curing resin are efficiently decomposed by the catalytic function of the $TiO_2$, do not adhere to the inner surface of the quartz tube, and are eliminated.

The above describes a case wherein a 0.5 $\mu$m $TiO_2$ coating layer was formed, but when 0.3 $\mu$m $TiO_2$ or 0.2 $\mu$m $TiO_2$ coating layer was formed, much better results were obtained in each case.

What is claimed is:

1. A method of applying an ultraviolet-curing resin on a linear body and curing the resultant coating thereof by passing the linear body through an ultraviolet-transmitting tubular member disposed inside a curing apparatus and by ultraviolet irradiation radiated from outside the ultraviolet-transmitting tubular member, wherein the inner surface of the ultraviolet-transmitting tubular member is coated with titanium dioxide, and the ultraviolet irradiation is performed in an atmosphere having an oxygen content of 0.1% or more inside the ultraviolet-transmitting tubular member, wherein the titanium dioxide coating layer on the inside surface of the ultraviolet-transmitting tubular member comprises titanium dioxide and a silicon dioxide binder.

2. A method of curing an ultraviolet-curing resin coating of a linear body according to claim 1, wherein the inside of the ultraviolet-transmitting tubular member is purged with a gas mixture of inert gas and air or oxygen.

3. A method according to claim 1, herein the inner surface of the ultraviolet-transmitting tubular member is coated with the titanium dioxide layer having a thickness of 0.03 $\mu$m or more but less than 0.5 $\mu$m.

4. A method of curing an ultraviolet-curing resin coating of a linear body according to claim 1, wherein the titanium dioxide coating layer on the inner surface of the tubular member comprises particulates having a diameter of less than 30 nm.

5. An ultraviolet-curing apparatus comprising: a tubular member through which a linear body coated with an ultraviolet-curing resin is passed; and an ultraviolet-irradiating lamp which is disposed outside of the tubular member and cures the ultraviolet-curing resin by irradiating ultraviolet rays transmitted through the wall of the tubular member, wherein the tubular member comprises a quartz tube the inner surface of which is coated with a coating layer having a thickness of 0.03 $\mu$m or more but less than 0.5 $\mu$m and containing titanium dioxide and a silicon dioxide binder therein.

6. An ultraviolet-curing apparatus according to claim 5, wherein the titanium dioxide contained in the coating layer on the inner surface of the quartz tube comprises particulates having a diameter of 30 nm or smaller.

* * * * *